Patented Nov. 27, 1951

2,576,753

UNITED STATES PATENT OFFICE 2,576,753

METHOD OF PRODUCING VANILLIN

John Henry Fisher, St. Catharines, Ontario, and Harry Borden Marshall, Toronto, Ontario, Canada, assignors to The Ontario Paper Company Limited, Thorold, Ontario, Canada No Drawing. Application January 7, 1949, Serial No. 69,816. In Canada August 11, 1948

4 Claims. (Cl. 260—600)

This invention relates to the production of vanillin, acetovanillone and other oxidation products from lignosulfonic acid compounds such as waste sulphite liquor and especially from the same after treatment such that the fermentable sugar content thereof has been reduced.

It is well known that lignosulfonic acid compounds can be used to produce vanillin and other products when subjected to oxidation under suitable conditions in the presence of caustic soda, or caustic potash. Cross reference is made to the co-pending applications of Marshall and Sankey, Serial Number 606,690 filed July 23, 1945 now Patent No. 2,516,827 and Serial Number 767,626 filed August 8, 1947 now Patent No. 2,544,999, and to that of Fisher and Marshall filed of even date hereof S. N. 69,815, in which are disclosed methods of effecting production of vanillin and co-products from lignin-containing substances in a particularly advantageous manner.

In our co-pending application S. N. 69,815 filed of even date hereof we have disclosed a method of producing vanillin in which lime is used as the active alkali. We have now found that the yield of vanillin and in general also the yield of acetovanillone and other related co-products is substantially increased as the initial concentration of lignin in the reaction vessel is decreased. This influence of the dilution of the lignin content of the materials supplied to the reactor could not have been predicted according to the known practice in this art and is specific to the use of lime as the active alkali. The increased yield which can be obtained is sufficient to justify the substantial dilution even of such lignosulfonic acid compounds as waste sulphite liquor and alcohol plant effluent. By alcohol plant effluent we mean the liquor remaining after sulphite liquor has been subjected to fermentation to produce ethyl alcohol. Since large volumes of waste sulphite liquor and/or alcohol plant effluent are produced in normal commercial operations, the normal tendency in handling these materials on an industrial scale would be to concentrate them, or otherwise effect an increase in the lignin content per unit volume as a preliminary step to such utilization. The contrary procedure of dilution which we have discovered as a means of effectively increasing vanillin yield in accordance with our invention is, therefore, a step which is contrary to generally accepted practice.

The dilution to which we refer may be effected by any one or a combination of means, for example, the waste sulphite liquor as drawn from the blow pits after discharge from sulphite digester may be diluted by inclusion of appropriate additions of water used to wash the pulp in the blow pit; further direct additions of water may be made to this liquor; the additions of water may be made as part of a subsequent processing of the waste sulphite liquor, for example, the fermentation of the sugar content thereof to produce ethyl alcohol; the lime used may be admitted to the reactor in a dilute aqueous slurry; and/or the reactor itself may be subjected to direct steaming. When used for the purpose of practising our invention any one or a combination of such means or the like are to be considered as lying within the scope thereof.

It will, of course, be apparent that there is a practical limit to the dilution of such a material as waste sulphite liquor beyond which the concentration of vanillin and co-products (regardless of their yield on a lignin basis) becomes so dilute that their subsequent recovery becomes impracticable. Examples of experiments which we have performed and which are herein given will illustrated the range of dilution which we have employed and of the yields which we have obtained therefrom.

In this specification the lignin content of lignin-containing substances is measured in terms of the methoxyl content thereof and in our experiments it is assumed that the ratio of methoxyl content to lignin content of any of the mixtures investigated is 15.5 to 100. Such an assumed ratio is in accordance with current good chemical usage in dealing with lignin-containing substances. Whether this assumed ratio is or is not numerically correct is immaterial because the ratio of methoxyl to lignin may be reasonably assumed to be constant for any given lignin-containing substance. The assumption of the above ratio will, therefore, serve for purposes of obtaining a valid relative guide to the quantity of lignin in lignin-containing substances.

In practicing our invention we pursue methods disclosed in our co-pending application S. N. 69,815 filed of even date hereof and use the apparatus described therein, but in the course of such operations we dilute the reaction mixture in a manner such as hereinbefore stated.

The concentration of lignin in undiluted waste sulphite liquor is dependent in some measure on the sulphite pulping procedure employed, but in general usually is a higher concentration than 70 grams per litre with concentrations of the order of 90 grams per litre or higher being typical.

The following description of experiments which have been performed by us will serve to illustrate the application and practice of our invention. It is to be understood that our invention is not limited to the materials and conditions described in these experiments which are to be considered as examples only.

In analyzing materials for their vanillin content, two general techniques have been employed. The first is a gravimetric procedure involving the separation and estimation of vanillin in the form of its m-nitrobenzoyl hydrazone. This is described by Buckland, Tomlinson and Hibbert, Can. J. Research 16B, 54 (1938), and is the more accurate of the two procedures but involves a tedious analytical operation. We employ ether as a solvent in place of trichloroethylene as described in the aforementioned reference.. The second is a spectrometric method of analysis according to the general method of Lemon, Ind. Eng. Chem., Anal. Ed. 19, 846 (1947). This is a rapid procedure which gives an overall measure of the substances present which are spectrometrically active at approximately 3500 $\mu\mu$, the vanillin being the principal substance present which is so active. This much more simple and rapid procedure has been used in a great deal of our work as a relative guide to the vanillin content of the various residues and has been frequently applied with the use of an appropriate empirical correction factor based on the ratio of the gravimetric to spectrometric results where both of these have been determined for the same type of residue.

A charge of alcohol plant effluent and slaked lime diluted with water was pumped into the reaction vessel and heated by direct steaming to 170° C., the lignin concentration of the said charge at the said temperature being 26 grams per litre and the volume in the reaction vessel under reaction conditions 45.6 U. S. gallons. Air was introduced at the rate of 32 lb. per hour for a total reaction time of 100 minutes, of which 15 minutes was before maximum temperature was reached and 85 minutes thereafter. The pressure in the reactor vessel was maintained at 153 lb. gauge. Samples were withdrawn from the reactor at various time intervals and analyzed spectrometrically. The peak vanillin yield was obtained at 60 minutes reaction time and by the gravimetric method was 6.7% vanillin on a lignin basis.

Previous control experiments with our equipment have established that an observed temperature of 170° C. corresponds to a steam gauge pressure of 103 lb. when no air is present. By difference, the partial non-condensible gas pressure in the reactor was therefore 50 lb. and the corresponding partial oxygen pressure less than 10 lb.

The above experiment was repeated with the same alcohol plant effluent, varying the lignin concentration by appropriate modifications in the dilution. The results obtained are given in the table below.

| Lignin Concentration in the Reactor as in the above Example | Yield of Vanillin |
|---|---|
| Grams per litre | Per Cent |
| 89.0 | 3.2 |
| 38.0 | 4.9 |
| 25.9 | 6.7 |
| 10.5 | 7.6 |

In the above table the yields are those as determined by the gravimetric method corresponding to the peak yield as indicated by spectrometric analysis.

When in this specification we use the expression "lignosulfonic acid compounds" we mean thereby materials derived from lignin when so treated that sulfonic acids are formed therefrom, e. g. when lignin-containing substances are subjected to the sulphite pulping process, and including salts of the said sulfonic acids.

When in the claims we refer to a pH of 12 or greater we have reference to the pH of a sample withdrawn from the reactor after being cooled to room temperature. In the determination of the pH we have used a glass electrode especially designed to be accurate in the range of high alkalinity measurements.

What we claim as our invention is:

1. A method of producing oxidation products including the calcium derivative of vanillin from lignosulfonic acid compounds, the initial lignin concentration of such compounds in an alkaline aqueous medium, measured as herein prescribed, being not more than 38 grams per litre nor less than 10 grams per litre, the said medium containing lime as the active alkali in an amount sufficient to maintain the pH of the reaction mixture determined on a sample withdrawn from the reaction zone and cooled to room temperature in the range not less than 12 to not more than that of a saturated solution of lime in the same mixture, which comprises introducing said compounds into a reaction zone, heating the reaction mixture to a temperature not less than 120° C., nor more than 200° C., maintaining said zone under super-atmospheric pressure, continuously passing a gas containing free oxygen in finely dispersed form through said reaction zone, continuously removing residual gas, the rate of addition and removal of said gas being such as to maintain a partial pressure of oxygen in said zone of less than 20 lb. per square inch, the time of said reaction being less than four hours.

2. The process of claim 1 wherein the lignosulfonic acid compound is sulphite waste liquor.

3. The process of claim 1 wherein the lignosulfonic acid compound in sulphite waste liquor which has been previously treated to reduce the fermentable sugar content thereof.

4. The process of claim 1 wherein the liquid portion of the reactor discharge is separated from the solid portion thereof prior to acidification to release free vanillin therefrom.

JOHN HENRY FISHER.
HARRY BORDEN MARSHALL.

REFERENCES CITED

The following references are of record in the file of this patent:

UNITED STATES PATENTS

| Number | Name | Date |
|---|---|---|
| 2,099,014 | Hatch | Nov. 16, 1937 |
| 2,187,366 | Schulz | Jan. 16, 1940 |
| 2,434,626 | Salvesen et al. | Jan. 13, 1948 |

OTHER REFERENCES

Ser. No. 318,386, Freudenberg et al. (A. P. C.), published April 20, 1943.

Pearl, "Vanillin From Lignin Materials," Jour. Amer. Chem. Soc., vol. 64 (1942q, pages 1429–1431.